United States Patent [19]

Hanaway

[11] Patent Number: 5,054,937
[45] Date of Patent: Oct. 8, 1991

[54] GUIDE SLEEVE, GUIDE POST AND BALL BEARING ASSEMBLY WITH ROLLER PLUG

[76] Inventor: Ronald L. Hanaway, 30210 E. Eight Mile Rd., Farmington Hills, Mich. 48236

[21] Appl. No.: 646,215
[22] Filed: Jan. 28, 1991
[51] Int. Cl.$^5$ .................. F16C 29/04; F16C 43/06
[52] U.S. Cl. .................................. 384/49; 384/30; 384/508
[58] Field of Search .............. 384/30, 49, 48, 507, 384/508, 509

[56] References Cited

U.S. PATENT DOCUMENTS

| | | | |
|---|---|---|---|
| 3,148,922 | 9/1964 | Roessler, Jr. | 384/508 |
| 3,514,166 | 5/1970 | Coley | 384/49 |
| 4,648,727 | 3/1987 | O'Neil et al. | 384/49 |
| 4,664,534 | 5/1987 | Hanaway | 384/30 X |

FOREIGN PATENT DOCUMENTS

| | | | |
|---|---|---|---|
| 0024742 | 6/1906 | Austria | 384/508 |
| 0197861 | 5/1923 | United Kingdom | 384/508 |

Primary Examiner—Thomas R. Hannon
Attorney, Agent, or Firm—Dykema Gossett

[57] ABSTRACT

In combination, a guide post having a longitudinal slot and a ball bearing cage adjustably receiving the post and adapted for relative longitudinal and rotary movements, there being an internal annular recess in said cage inwarly of one end. A truncated roller bearing with opposed hemispherical surfaces and opposed flat sides is guidably positioned within the slot with the roller bearing maintaining a rolling point contact with the bottom wall of the slot and with the roller flat sides loosely and slidably registerable with the side walls of the slot. One of the hemispherical surfaces of the bearing being positioned and retained within an internal annular recess within the ball cage. There being a transverse arcuate slot through the cage in registry with its annular recess and an arcuate pull plug nested and retained within the slot and having an internal arcuate recess forming a continuation of the cage recess. A set screw in the cage retainingly engages the pull plug.

14 Claims, 1 Drawing Sheet

GUIDE SLEEVE, GUIDE POST AND BALL BEARING ASSEMBLY WITH ROLLER PLUG

FIELD OF INVENTION

The present invention relates to a guide sleeve, guide post and modified bearing assembly for maintaining an alignment of a pair of parallel plates during relative reciprocal movements and wherein upper and lower die shoes may be mounted upon said plates.

BACKGROUND OF THE INVENTION

In the guide sleeve, guide post and bearing assembly of U.S. Pat. No. 4,664,534 dated May 12, 1987, of Applicant's Assignee, one disadvantage was that at times portions of the set screw 51 for trapping the roller 41 within the annular recess 43 of the ball cage 35 had a limited mechanical interference with the adjacent roller 41 as it rolled along guide slot 33.

Further in seeking an entry of the roller 41, FIG. 7, of that Patent, into the interior of the ball cage 35 for entry into the recess 43 there were difficulties in broaching the exterior corners 53 to the radial opening when inserting the roller 41, and the subsequent threading of the bore 49 for insertion of the set screw 51 into the ball retainer or cage so as to trap the roller within the cage recess 43.

Further difficulties were involved in the engineering of a special type of roller 41 with rounded corners at 47, FIG. 6, such as would permit its insertion radially into the bore 49 and ultimately into the recess 43 to prevent any binding of portions of the roller 41 with respect to the cage during relative rotary movements of the cage with respect to the roller as constrained against rotation within the slot 33 of the post 29.

SUMMARY OF THE INVENTION

An important feature is to provide in combination a guide post having a longitudinal axis and a longitudinal slot substantially throughout its length having a bottom wall and opposed side walls and a cylindrical ball bearing cage having a coaxial longitudinal axis adjustably receiving the post adapted for relative longitudinal and rotary movements thereon and with the cage having an internal annular recess. A truncated roller bearing having opposed hemispherical surfaces and additionally opposed flattened sides is guidably positioned within the guide post slot. The roller maintains a rolling point contact with the bottom wall of the slot and the roller flat sides are loosely and slidably registerable with the side walls of the slot during relative longitudinal movements of the ball cage with respect to the post. The truncated roller is slidably nested within an annular recess in the ball cage.

As another feature, the roller is alternately registerable with opposite ends of the longitudinal slot limiting rectilinear movement of the ball cage relative to the guide post.

As another feature, one of the hemispherical portions of the roller is positioned within the annular cage recess. The cage is adapted for rotary sliding movement relative to said roller in a direction at right angles to the longitudinal axis of the guide post.

As still another feature, there is provided a milled radial slot through the ball cage communicating with its internal annular recess through which the roller bearing is inserted, together with a corresponding pull plug or radial segment inserted and secured within the radial slot for trapping the roller within said cage.

As still another feature, there is provided upon the interior of the pull plug segment and internal recess of the same shape as said cage recess to form a smooth continuation thereof. This permits the cage to roll up to 360 degrees with respect to the truncated roller bearing within its recess and retained within the guide post slot.

As another feature, a set screw threaded into said cage retainingly engages the pull plug or segment against removal from the ball cage.

These and other features and objects will be seen from the following specification and claims in conjunction with the appended drawing.

THE DRAWING

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Figure 1:
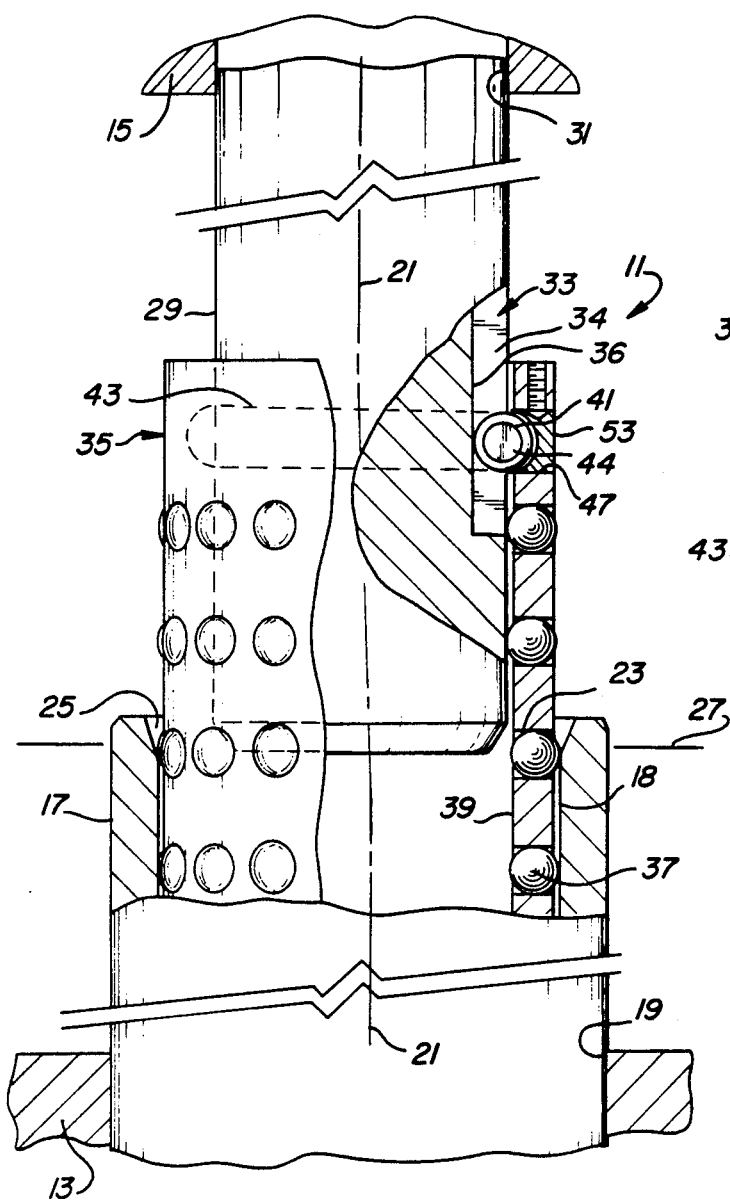
FIG. 1 is a fragmentary partly broken away and sectioned elevational view of the present guide sleeve, guide post and modified bearing assembly as used in conjunction with a pair of relatively movable upper and lower die shoes, fragmentarily shown and with a pull plug nested within the bearing assembly.

Referring to the drawing, FIG. 1, the illustrative die set with guide sleeve, guide post and modified bearing assembly is generally indicated at 11, and includes lower die shoe 13, fragmentarily shown. Overlying the lower die shoe is an upper die shoe 15, fragmentarily shown, which is adapted for vertical reciprocal movements with respect to lower die shoe 13 and with respect to tooling components mounted upon the corresponding die shoes in a conventional manner, not shown.

The present guide post, guide sleeve and bearing assembly includes the open ending guide sleeve 17, fragmentarily shown, having a cylindrical bore 18 and press fitted or otherwise secured in an upright position within a corresponding aperture 19 in lower die shoe 13.

Sleeve 17 has a central longitudinal axis 21 and is adapted to receive a corresponding guide post 29 having a similar longitudinal axis 21. The upper end of guide post 29, fragmentarily shown, is press fitted or otherwise secured within aperture 31 in upper die shoe 15.

An elongated guide slot 33 is fragmentarily shown, formed along a portion of the length of post 29 on its exterior as needed. Said slot includes side walls 34 and bottom wall 36. A second identical guide slot 33 may be formed upon the opposite side of said post if desired. The cylindrical ball cage 35 or ball bearing retainer in the illustrative embodiment includes a series of longitudinally spaced circles of apertures 23 within which are positioned and entrapped or loosely retained a corresponding plurality of spaced ball bearings 37. These are arranged in longitudinally spaced circles so as to movably project through the body of the ball cage exteriorly and interiorly thereof, FIG. 1.

Figure 3:
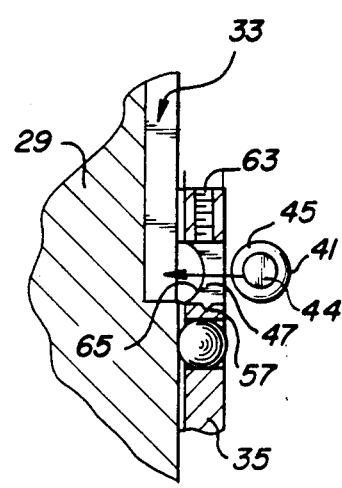
FIG. 3 is a fragmentary partly broken away section corresponding to the upper portion of FIG. 1 with the roller bearing removed.

Within the ball bearing retainer 35 adjacent its bore 39 there is provided an internal annular recess 43 inwardly of one end thereof which receives truncated roller bearing 41. A portion of the truncated bearing 41 guidably projects into guide post slot 33. The present engineered truncated roller 41 has a pair of opposed machined flat surfaces 44, FIG. 3, and a pair of opposed hemispherical surfaces 45.

In operation the present sleeve 17, guide post 29 and bearing assembly 35 is interposed with respect to the upper and lower die shoes 15 and 13, respectively. Slot 33 within the guide post 29 cooperatively receives the truncated roller bearing 41 limiting relative longitudinal movements of the ball bearing cage 35 along the length of post 29.

With the roller 41 positioned within slot 33 which has a bottom wall 36 and a pair of opposed side walls 34, said roller maintains a rolling point contact with said bottom wall. At the same time the roller opposed flat sides 44 loosely and slidably register with the opposed side walls of said slot.

During conventional reciprocal movements of the guide post 29 with respect to sleeve 17 and with the ball cage 35 mounted upon the guide post and interposed between the guide post and sleeve, longitudinal reciprocal movement of the post effects corresponding longitudinal movements of ball cage 35 with respect to sleeve 17.

While the truncated roller 41 is trapped within slot 33, ball cage 35 is free for rotation with respect to guide post 29 and guide sleeve 17 and is therefore capable of relative rotary movements with respect to both guide post 29 and sleeve 17. The ball cage is free for such relative rotary movements with respect to the guide post and sleeve when the post and sleeve are disengaged so that there is no preload. After each separation there is an opportunity for relative rotation. By providing a ball cage which is free for rotation, tracking of the ball bearings 37 in the cage with respect to the guide post and sleeve is reduced and friction is minimized.

In the illustrative embodiment, bore 18 of sleeve 17 is slightly over size with respect to the maximum diameter of the ball bearing assembly 35, so that it is free to enter the sleeve 17 during the down stroke.

The upper end of the sleeve 17 is tapered outwardly at 25 and transversely of said sleeve there is schematically shown a preload line 27. There is an oversize relation of the ball bearing assembly after the cage and guide post has lowered into the sleeve of about 0.001 inches with respect to sleeve 17. Thus, there is then a preload of the balls with respect to said sleeve.

As an improvement and simplification over the disclosure of U.S. Pat. No. 4,664,534 there is provided the present improved and engineered truncated roller 41, FIGS. 1-4. As viewed in FIGS. 1 and 2, in operation the roller 41 has an instantaneous point of contact upon one side with bottom wall 36 of the post slot 33 as the roller 41 moves along the length of said slot during relative reciprocal movements of guide post 29 with respect to sleeve 17. This reduces friction to a minimum with such instantaneous point contact of one of the hemispherical opposed portions 45 of the roller in engagement with the bottom wall of slot 33.

At the same time the opposed flattened walls 44 of the truncated roller are arranged adjacent to and move along and are guidably engaged by the opposed side walls 34 of longitudinal slot 33.

The present invention provides an improved ball cage for assembly and trapping the engineered roller 41 within cage recess 43. A milled arcuate slot 47 is formed through the wall of ball cage 35, in registry with internal recess 43. Said slot is arcuate to match the radius of the cage as is generally rectangular or square.

The slot is defined by spaced side walls 49 with top and bottom walls 51.

Figure 2:
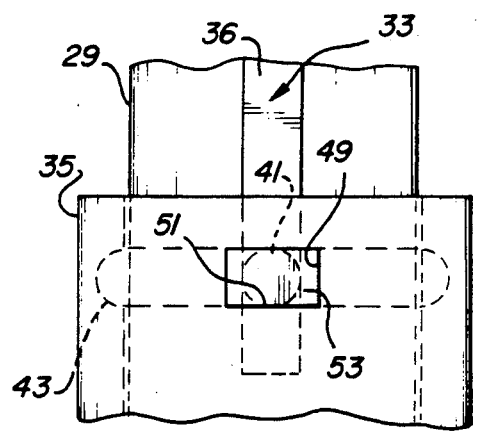
FIG. 2 is a fragmentary right side elevational view thereof including the pull plug with the cage and guide post partly broken away.

A radial arcuate segment 53 or pull plug of arcuate form to match the cage is of a size as to removably fit into slot 47, FIGS. 1 and 2. The arcuate segment 53 or pull plug is either square or rectangular or other shape, to match the shape of slot 47 and fit therein. Detent 55 on the bottom of pull plug 53, FIG. 4, nests within a corresponding detent recess 57 in the bottom wall 51 of slot 47, FIG. 3. Opposed anchor recess 59 in the top of pull plug 53, FIG. 1, cooperatively receives set screw 61, threaded into bore 63 at one end of cage 35. The interior surface of the segment or pull plug 53 has an arcuate recess 65 of arcuate cross-section such as to form a continuation of cage recess 43.

Figure 4:
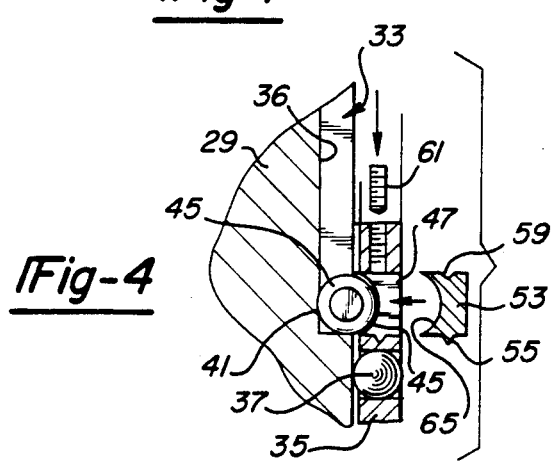
FIG. 4 is a fragmentary section view with the set screw and pull plug removed.

For disassembly of the ball cage 35 with respect to guide post 29, said post 29 is separated from bushing 17, or axially elevated therefrom, and set screw 61 is partly unthreaded, FIG. 4.

Once the set screw 55 has been unthreaded, the segment or pull plug 53 is knocked out or otherwise pulled from the ball cage 35. This permits the truncated roller 41 to move radially outward through slot 47, FIG. 3. At this time the ball cage 35, fragmentarily shown in FIG. 1, may be withdrawn from guide post 29.

For reassembly the truncated roller 41 is initially positioned within the slot 47 FIG. 4 and thence into slot 33. Then the pull plug 53 is reassembled, FIG. 1, and the set screw 61 threaded down into anchor recess 59. This traps the truncated roller 49 within the cage and in registry with plug recess 65 and cage recess 43.

I claim:

1. In combination, a guide post having a longitudinal axis and a longitudinal slot with opposed sides and a bottom substantially throughout its length;

a cylindrical ball bearing cage having a co-axial longitudinal axis adjustably receiving said post, and adapted for relative longitudinal and rotary movements thereon;

said bearing cage mounting a plurality of spaced circularly arranged ball bearings extending substantially the length of said cage and yieldably projecting inwardly and outwardly thereof, respectively, there being an internal annular recess in said cage inwardly of one end thereof;

a truncated roller bearing having opposed hemispherical surfaces and opposed flat sides, guidably positioned within said longitudinal slot with the roller bearing maintaining a rolling point contact with the bottom of said slot with the roller bearing flat sides loosely and slidably registerable with opposed sides of said slot;

said roller bearing being alternately registerable with opposite ends of said longitudinal slot, limiting rectilinear movements of the ball cage relative to said guide post;

one of the hemispherical portions of said roller bearing being positioned within the cage recess;

said cage including its recess being adapted for rotary sliding movement relative to said roller bearing in a direction at right angles to said axis; and there being a transverse arcuate slot through said cage in registry with said annular recess, and an arcuate pull plug nested within said arcuate slot, and having an internal arcuate recess of the same shape as said cage annular recess forming a continuation thereof for trapping the roller bearing therein and within said ball cage.

2. In the combination of claim 1, further comprising fastener means on said cage for securing said pull plug within the contour of said cage.

3. In the combination of claim 2, further comprising said fastener means including a set screw axially threaded into said cage and interlocked with said pull plug.

4. In the combination defined in claim 3, further comprising, unthreading of said set screw permitting removal of said pull plug, removal of said roller bearing from said cage and disassembly of said cage from said guide post.

5. In the combination of claim 3, said fastener means further comprising a detent depending from said pull plug and a corresponding anchor recess in said cage receiving said detent.

6. In the combination defined in claim 3, further comprising said arcuate segment internal recess having a cross-sectional shape the same as said cage recess defining a smooth continuation thereof facilitating rotary movement of the cage and segment relative to said roller bearing.

7. In the combination defined in claim 2, further comprising said slot having width and height greater than the corresponding dimensions of said roller bearing.

8. In the combination defined in claim 1, further comprising a guide sleeve having a coaxial longitudinal axis, with said ball cage and guide post projected into said sleeve for relative longitudinal movements and for rotary movements of said cage relative to said sleeve when separated from said guide post.

9. In the combination defined in claim 1, further comprising said guide post and sleeve being upright and at their ends projected into and respectively secured within the upper and lower relatively movable die shoes of a die set assembly.

10. In combination, a guide post having a longitudinal axis and a longitudinal slot with opposed sides and a bottom substantially throughout its length;

a cylindrical ball bearing cage having a co-axial longitudinal axis adjustably receiving said post, and adapted for relative longitudinal and rotary movements thereon;

said bearing cage mounting a plurality of spaced circularly arranged ball bearings extending substantially the length of said cage and yieldably projecting inwardly and outwardly thereof, respectively, there being an internal annular recess in said cage inwardly of one end thereof;

a roller bearing guidably positioned within said longitudinal slot with the roller maintaining a rolling contact with the bottom of said slot and loosely and slidably registerable with opposed sides of said slot;

said roller bearing being alternately registerable with opposite ends of said longitudinal slot, limiting rectilinear movements of the ball cage relative to said guide post;

a portion of said roller bearing being positioned within the cage recess;

said cage including its recess being adapted for rotary sliding movement relative to said roller bearing in a direction at right angles to said axis;

there being a transverse arcuate slot through said cage in registry with said annular recess; and an arcuate pull plug nested within said arcuate slot, and having an internal arcuate recess of the same shape as said cage annular recess forming a continuation thereof for trapping the roller bearing therein and within said ball cage.

11. In the combination of claim 10, further comprising fastener means on said cage for securing said pull plug within the contour of said cage.

12. In the combination of claim 10, further comprising said fastener means, including a set screw axially threaded into said cage and interlocked with said pull plug.

13. In the combination of claim 10, said fastener means further comprising a detent depending from said pull plug and a corresponding anchor recess in said cage receiving said detent.

14. In the combination defined in claim 10, further comprising said slot having width and height greater than the corresponding dimensions of said roller bearing.

* * * * *